A. SCHWIEGER.
LIQUID STRAINER.
APPLICATION FILED MAY 16, 1908.

925,517.

Patented June 22, 1909.

Witnesses:
Patrick J. Conroy
E. B. Tomlinson

Inventor
A. Schwieger
by R. Haddan
Attorney

UNITED STATES PATENT OFFICE.

ADOLF SCHWIEGER, OF HANOVER, GERMANY.

LIQUID-STRAINER.

No. 925,517.　　　Specification of Letters Patent.　　　Patented June 22, 1909.

Application filed May 16, 1908.　Serial No. 433,300.

*To all whom it may concern:*

Be it known that I, ADOLF SCHWIEGER, engineer, a subject of the German Emperor, residing at Hanover, in the German Empire, have invented a certain new and useful Improvement in Liquid-Strainers, of which the following is a specification.

This invention relates to strainers for liquids such as infusions of coffee or tea, and other beverages, and its object is to prevent the dripping of the residual liquid from such strainers after they have been used.

Figure 1:
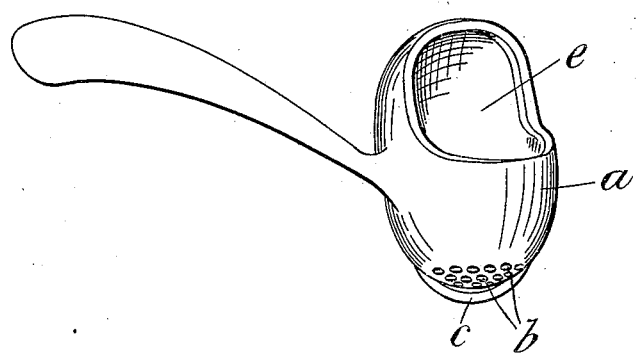
Figure 2:
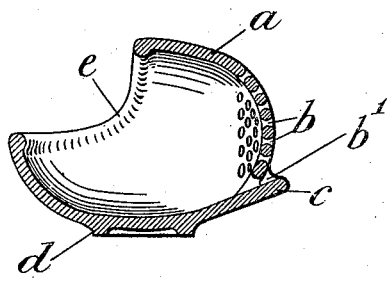

In the annexed drawings, Figure 1 is a side-elevation showing the strainer in the position in which it is held while in use. Fig. 2 is a section of the bowl, showing it in the position in which it is laid down after use.

The strainer shown in the drawing has an ovoid bowl $a$ cut away as at $e$ for approximately a quarter of its envelop between planes at right angles to one another containing the major and minor axes of the ovoid, and having perforations $b$ at one end.

Adjacent to the perforated portion, a lip $c$ protrudes from the bowl, so that when the latter is laid on its side, after use, as shown in Fig. 2, the residual liquid which flows downward from the part $b$ falls on to the said lip whence it may flow into the bowl by one or some of the perforations $b^1$.

The strainer shown in the drawing has a foot $d$ on which it rests when laid on its side.

What I claim as my invention and desire to secure by Letters Patent of the United States is:—

A liquid strainer consisting of an ovoid bowl having a perforated area at one end thereof normally at a distance above the bottom of the bowl, a foot on the under side of the bowl on which said strainer may rest, and an exterior lip between said foot and perforated area and immediately adjacent to the latter, said foot and lip being integral with the bowl and the lip so placed that external drips from the perforated portion pass through the lowermost perforations back into the bowl and remain in the bottom thereof when the strainer rests on said foot.

In witness whereof I have signed this specification in the presence of two witnesses.

ADOLF SCHWIEGER.

Witnesses:
　M. L. THOMPSON.
　HENRY RUBBE.